(12) United States Patent
Dmitrievich et al.

(10) Patent No.: US 7,137,254 B1
(45) Date of Patent: Nov. 21, 2006

(54) COAXIAL SPRAY NOZZLE INJECTOR

(75) Inventors: Gorokhov Victor Dmitrievich, Voronezh (RU); Lobov Sergey Dmitrievich, Voronezh (RU); Chernichenko Vladimir Victorovich, Voronezh (RU)

(73) Assignees: Federal State Unitary Enterprise Chemical Automatic Design Bureau (CADB), Voronezh (RU); Federal Agency for Legal Protection of Military, Special and Dual Use Intellectual Activity Results Under Ministry of Justice of Russian Federation, Moscow (RU)

( * ) Notice: Subject to any disclaimer, the term of this patent is extended or adjusted under 35 U.S.C. 154(b) by 166 days.

(21) Appl. No.: 10/312,914

(22) PCT Filed: Jul. 5, 2000

(86) PCT No.: PCT/RU00/00275

§ 371 (c)(1),
(2), (4) Date: Feb. 24, 2003

(87) PCT Pub. No.: WO02/02990

PCT Pub. Date: Jan. 10, 2002

(51) Int. Cl.
*F02C 1/00* (2006.01)
*B05B 7/06* (2006.01)

(52) U.S. Cl. .................... 60/740; 239/424
(58) Field of Classification Search .......... 60/258, 60/740; 239/418, 423, 424, 601
See application file for complete search history.

(56) References Cited

U.S. PATENT DOCUMENTS 2,619,821 A * 12/1952 Fink ..................... 239/424
2,719,584 A * 10/1955 Winslow ................ 239/424
3,484,044 A * 12/1969 Dombruch et al. ......... 239/424
4,184,637 A * 1/1980 Mushenko et al. ......... 239/424
4,863,102 A * 9/1989 Levin ....................... 239/424
5,129,582 A * 7/1992 Rieke et al. .............. 239/601
5,899,388 A * 5/1999 Sion et al. ................ 239/424

FOREIGN PATENT DOCUMENTS

| DE | 2040827 | 5/1982 |
| DE | 3835381 | 4/1990 |
| FR | 2000773 | 9/1969 |
| FR | 2283393 | 3/1976 |
| SU | 5226 | 4/1926 |
| SU | 1320593 | 6/1987 |
| WO | WO 95/05560 | 2/1995 |

* cited by examiner

*Primary Examiner*—Michael Koczo, Jr.
(74) *Attorney, Agent, or Firm*—James Creighton Wray

(57) ABSTRACT

The invention relates to power plants, in particular to devices for mixing and atomizing propellant components, and may be used for development injection elements and injector heads of liquid-fuel rocket engines (LRE).

The task of the invention is to increase the propellant component combustion efficiency via the increase of propellant component contact area.

This task is solved by provision of radial grooves 3 in the outlet portion of a hollow tip 1 of the coaxial-jet injection element, the said hollow tip connecting the cavity of one propellant with the combustion zone, a sleeve 5 surrounding the said tip providing an annular gap 4 connecting the cavity of another propellant with the combustion zone. The sleeve inner surface outlet portion is equidistant relatively to the tip grooves outer surface, and the outlet cross-section area between the sleeve equidistant surface and the tip grooves is $F_r=(0,6-2,2)F_o$, where $F_o$ is the groove cross-section area at the tip outlet, 2 dependent claims, 3 Figures.

9 Claims, 1 Drawing Sheet

Coaxial jet injector element

Coaxial jet injector element

COAXIAL SPRAY NOZZLE INJECTOR

This application claims the benefit of PCT/RU00/00275 filed Jul. 5, 2000.

FIELD OF THE INVENTION

The invention relates to power plants, in particular to devices for mixing and atomizing propellant components, and may be used for development injection elements and injector heads of liquid-fuel rocket engines (LRE).

BACKGROUND OF THE INVENTION

One of the main problems in the development of devices for mixing and atomization propellants is to provide maximum attainable propellant combustion efficiency—this may be achieved through increase of an area of propellant contact surface and decrease of jet characteristic cross-section size for one of propellants.

Concerning known injector element designs, the realization of the above requirements leads to considerably complicated design.

It is known a coaxial jet injection element having a tip made as a hollow cylinder connecting the liquid oxidizer cavity with combustion zone (combustion chamber interior) and moreover, having a sleeve with cylindrical internal surface that surrounds said tip providing clearance and connecting the gaseous fuel cavity with combustion zone (V. E. Alemasov et al.: "Theory of rocket engines"—Textbook for students acquiring machine-building specialization in higher education centers, Moscow, Publishing House "Mashinostrojenie", 1980, FIG. 18.2, pp. 225–226).

The oxidizer in this injection element is supplied into the combustion zone through the axial channel in the tip interior while the fuel is supplied through the annular gap between the said sleeve and the said tip. The oxidizer jet at the injection element outlet has the form of solid cone directed with its vertex toward the injection element tip, while the fuel jet has the form of hollow cone. The fuel-oxidizer contact takes place on the surface of the solid cone. Such supply scheme doesn't provide due quality of propellants spraying—this lowers the coefficient of propellant combustion efficiency and, as a consequence, leads to losses of the thrust specific impulse value.

It is known the powder coal burner comprised of a body with injection ports in the lateral surface, comprising moreover a conical insert placed in front of the said ports, this conical insert having a conical corrugated extension mounted with provision of annular gap between the said extension and the said conical insert with axial displacement of the said extension, and the number of corrugations of the said extension is equal to the number of the ports in the body, the corrugation peaks being directed towards the said body central line and positioned in front of respective ports (Cert. of invention, SU 1320593).

It is known a burner containing a tube connected with a gas source, the said tube having an outlet nozzle with radial longitudinal grooves in its wall, the said wall has longitudinal corrugations forming the said grooves. The forward end faces of the corrugations are located on the cone generating line having the 45–180° angle inside nozzle (Cert. of invention, SU No. 909432).

It is known a burner with a tube and an outlet nozzle having radial grooves in its wall (SU497650).

It is known an open injector for internal combustion engine, having the said injector the improved form of sprayer outlet orifice that influences upon the propellant jet form in dependence of the propellant supply flow rate. The said injector provides reliable inflammation and full combustion of the working mixture due to that the injector orifice has an expanding towards the outlet grove, and the form of the said opening is preferably linear or curvilinear that gives asymmetry to the exit cross-section.

The said opening may have oval, rectangular or round form in cross-section or the form of two contiguous circumferences (patent application FR No. 2420038 of 16.03.78).

The main disadvantage of the above mentioned devices is the low value of mixture formation completeness. This leads to incomplete combustion of propellants and reduced efficiency.

BRIEF SUMMARY OF THE INVENTION

The invention task is to increase the propellant combustion efficiency through increasing of a propellant contact area at the cost of radial grooves provided on the tip outlet section. The provision of the grooves will allow to change the jet form of one of the propellants transforming the round jet into the star-shaped cross-section jet having several radial plums with unchanged tip cross-section area. This will increase the propellant contact area at the expense of additional contact on the plum surface and will decrease the characteristic cross-section size of jet of one of propellants thus increasing the combustion efficiency. The invention task is achieved by provision of radial grooves in the outlet portion of a tip pertained to the coaxial-jet injection element comprised of said hollow tip connecting the cavity of one propellant with the combustion zone, moreover, the said injection element is provided with a sleeve surrounding the said tip with provision of a clearance between them, the said clearance connects the cavity of another propellant with the combustion zone, being the said sleeve internal surface equidistant to the profiled external surface of tip grooves.

The increase of propellant contact area at the injection element outlet and the reduced length of the non-atomized liquid jet are provided at the cost of changing the round jet form into the star-shaped jet with several radial plums Based on the results of tests of the subscale LOX-LH$_2$ combustion chamber in staged-composition (fuel-rich scheme) engine performed for the testing of the injection elements made with radial grooves in the tip outlet part and with a cylindrical sleeve, we've obtained the mixing efficiency $\phi_K$=0.997±0.0016 that exceeds the reference value $\phi_K$=0.994±0.0009 for reference injection elements with cylindrical tip and cylindrical sleeve. During the tests the oxidizer (oxygen) was supplied into tip interior and fuel was supplied into the annular gap between the tip and the sleeve.

It should be noted that high mixing efficiency may be obtained with this injection element design on condition that the preburner gas flowrate values are maintained the same if compared with ordinary coaxial injection element ($W_{rr}$=300–350 m/s). This condition is realized when the exit cross-section for fuel is $F_r$=(1,2-2,2) $F_o$, where $F_o$ is the exit cross-section for oxidizer.

However, for the expander-cycle engines (liquid oxidizer, for example, oxygen and gaseous fuel, for example, hydrogen, are supplied into injection elements), it is true the following expression $F_r$=(0,6-1,0)$F_0$. The comparative analysis shows that the open flow area for gaseous component in this case is ≈50% reduced. The use of the injection elements with the ratio $F_r$=(1,2-2,2)$F_0$ in the expander-cycle engine reduces the gas flow rate by 50% leading to decrease of the propellant combustion efficiency. This has been proved in the hot tests of injection elements with such design when tested as integrated into the model LOX-LH$_2$ expander cycle combustion chamber. The combustion efficiency in these tests was $\phi_K$=0.9902 (instead of $\phi_K$=0.994).

It should be noted that the reduced flow rate of gas at injection element outlet and the relatively reduction of propellant flow rates ratio (W$_r$/W$_o$) may lead to unstable combustion process. At the realization of sleeve surfaces-tip surfaces equidistant clearance, with cross-section area at the exit F$_r$=(0,6-2,2)F$_o$, where F$_o$ is the tip exit cross-section, the provision of the equal space between the sleeve outlet part inner surface and the tip grooves (ribs) outer surface will allow to obtain required gaseous propellant velocity at low fuel flow rates.

The low value of the mentioned ratio is selected based on the fact that at further decrease, the gaseous propellant velocity increase leading to essential pressure drop increase and the increase of the engine operation intensity.

The upper value of the mentioned ratio is selected based on the fact that at its further increase there takes place the gaseous propellant velocity decrease leading to drastic degradation of mixing conditions and eventual instability of combustion process.

When the proposed coaxial-jet injection element with radial grooves in the tip outlet part and equidistant profiled inner surface of the sleeve has been tested as integrated into the subscale LOX-LH$_2$ combustion chamber, the obtained mixture formation completeness was $\phi_K$=0.994±0.0016— this value exceeds the reference injection element mixing efficiency $\phi_K$=0.9918±0.001. At tests, the oxidizer, that is oxygen, has been supplied into the interior, and the fuel has been supplied into the annular gap between the tip and the sleeve.

BRIEF DESCRIPTION OF THE DRAWINGS

The proposed invention is illustrated with drawings.

The FIG. 1 shows the longitudinal section of proposed injection element, the FIG. 2 shows the cross-section of the said coaxial-jet injection element exit with a sleeve having cylindrical inner surface, the FIG. 3 shows the cross-section of the outlet part of the said coaxial-jet injection element with a sleeve having the inner surface that is equally spaced to the profiled surface of the tip grooves.

DETAILED DESCRIPTION OF THE INVENTION

Figure 1:
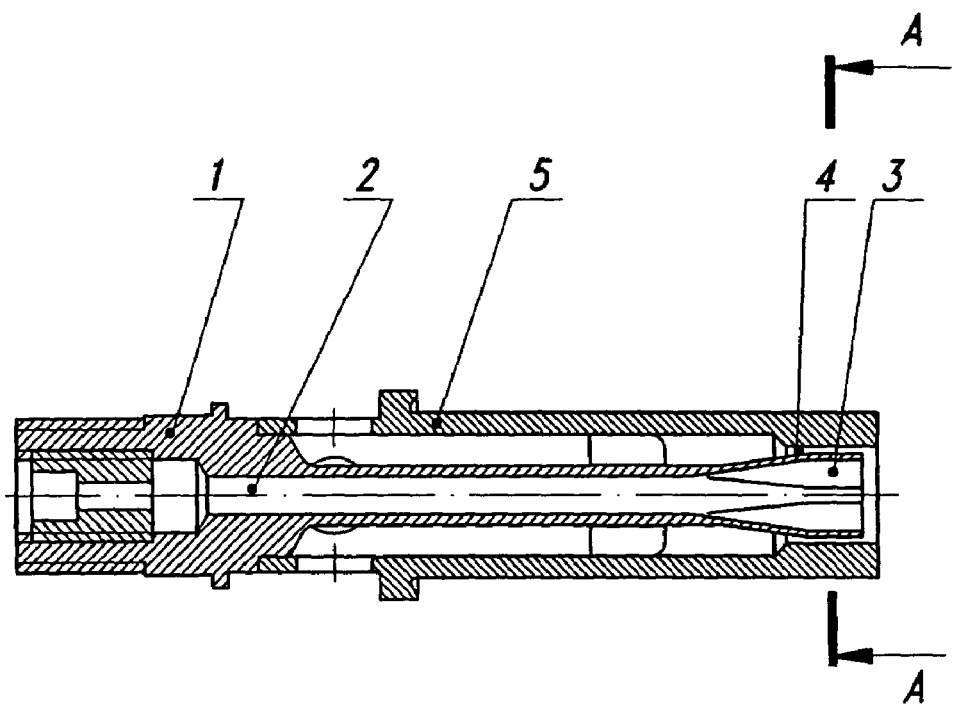
Figure 2:
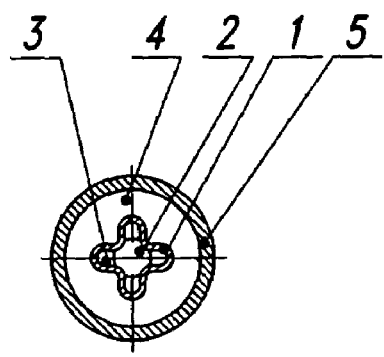
Figure 3:
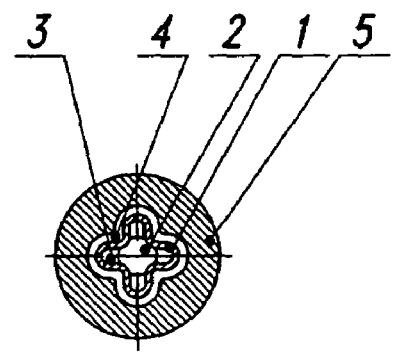

As can be seen from the FIG. 1, the coaxial-jet injection element contains a hollow tip 1 having an axial channel 2 inside, the said channel connecting the oxidizer cavity with the combustion chamber internal cavity. The tip outlet portion has radial grooves 3. The sleeve 5 is mounted on the tip 1 providing the annular gap 4 and connecting the fuel cavity with the combustion chamber interior. In the first design option, the sleeve 5 inner surface is cylindrical (FIG. 2). In the second design option (FIG. 3), the sleeve inner surface is equidistant with the outer surface of tip grooves and the exit cross-section area of the clearance between the sleeve ribs and the tip grooves is F$_r$=(0,6-2,2)F$_o$, where F$_o$ is the cross section area of the tip outlet.

The proposed injection element is functioning as follows.

The oxidizer from the oxidizer cavity is supplied into the combustion chamber through the channel 2 inside the tip 1. At the place of location of radial grooves 3, the oxidizer jet is transformed to the form of the tip exit section, that is the form of the radial grooves 3, hence the jet cross section form is changed leading to the increased perimeter of the contact at the constant cross-section area. The change of the oxidizer round jet form into the star-shaped one at the constant area of the exit cross-section improves the conditions of jet disintegration and allows to reduce the characteristic cross-section parameter of a jet and its non-atomized part length. Consequently, the oxidizer jet at the tip exit is predisposed to loss its integrity and requires less time for atomization. Such effect upon a jet allows to improve the propellant mixing conditions at all operational modes.

The fuel from the fuel cavity is supplied into the combustion zone through the gap 4 between the tip 1 and the sleeve 5. In the first design option, the sleeve inner surface and the jet outer surface have the cylindrical form. In the second design option, at the place of location of sleeve 5, the fuel jet transforms the form to that of profiled annular gap between the tip 1 and the sleeve 5, i.e. the fuel jet becomes equally spaced to the oxidizer jet.

Design Options of the Invention

The applicant of patent has manufactured pilot models of proposed injection elements and tested them as integrated into LOX-LH$_2$ combustion chambers.

The geometry parameters and propellant supply modes should be defined depending on the engine thrust.

The coaxial-jet injection element with radial grooves in the tip outlet part and a cylindrical sleeve has been tested in the model 25 kN LOX-LH$_2$ combustion chamber in engine, operating with staged-combustion (fuel-rich) cycle. During the tests, the mixing efficiency $\phi_K$=0.997±0.0016 has been obtained, that exceeds the value of the coefficient $\phi_K$=0.994±0.0009 for reference injection elements with cylindrical tip and cylindrical sleeve.

The coaxial-jet injection element with radial grooves in the tip outlet part and a sleeve with equidistant profiled inner surfaces has been tested in the 25 kN LOX-LH$_2$ subscale combustion chamber. During the tests, the mixing efficiency $\phi_K$=0.994±0.0016 has been obtained, that exceeds the value of equivalent coefficient $\phi_K$=0.9918±0.001 specified for reference injection elements with a cylindrical tip and a cylindrical sleeve.

POTENTIAL INDUSTRIAL APPLICATIONS

The implementation of the said injection elements in the developed LRE instead of the injection elements with cylindrical surfaces at outlet part will allow to increase the specific impulse value approximately on (0.3-0.5)% and to provide max attainable mixing efficiency for the engines operating with staged combustion cycle may be achieved with the use of coaxial-jet injection elements with radial grooves in the top outlet portion and the use of the sleeve with equidistant profiled inner surfaces.

It is also rational to use the said injection elements in the LOX-methane LREs.

The invention claimed is:

1. Coaxial-jet injection element comprising a hollow tip connecting the cavity of one propellant with a combustion zone and a sleeve that surrounds the said tip providing a gap and connecting the cavity of another propellant with the combustion zone, and further comprising radial grooves in the tip outlet portion.

2. The coaxial-jet injection element claim 1, wherein a sleeve inner surface outlet part is equidistant relative to a tip grooves outer surface.

3. The coaxial-jet injection element of claim 2, wherein the outlet cross-section between the sleeve equidistant surface and the tip grooves is $F_r=(0,6-2,2)F_0$, where $F_0$ is the grooves cross-section area at the tip outlet.

4. A coaxial-jet injection element comprising:
oxidizer for flowing through a central channel to a combustion chamber,
a radially grooved tip on an end of the channel nearest the combustion chamber, and a gap for flowing fuel past the radially grooved tip to the combustion chamber, and
wherein the gap is located between the channel and a sleeve surrounding the channel.

5. The apparatus of claim 4, wherein an end of the sleeve opposite the radially grooved tip has a cylindrical form.

6. The apparatus of claim 4, wherein an end of the sleeve opposite the radially grooved tip has complementary grooves corresponding to the grooves on the tip.

7. The method of claim 5, wherein an end of the sleeve opposite the radially grooved tip has a cylindrical form.

8. The method of claim 5, wherein an end of the sleeve opposite the radially grooved tip has complementary grooves corresponding to the radially grooved tip.

9. A method of injecting oxidizer and fuel comprising:
supplying oxidizer to a channel,
passing the oxidizer through the channel,
passing the oxidizer through a radially grooved tip on the end of the channel,
passing the oxidizer as a jet through the radially grooved tip and imparting a star-shaped cross section form to the jet,
passing the jet into a combustion chamber,
supplying fuel to a gap between the channel and a sleeve surrounding the channel,
passing the fuel past the radially grooved tip and into the combustion chamber, and
mixing the oxidizer and the fuel together in the combustion chamber.

* * * * *